United States Patent [19]

Tomlinson

[11] Patent Number: 4,915,530
[45] Date of Patent: Apr. 10, 1990

[54] KINGPIN ASSEMBLY

[75] Inventor: Malcolm Tomlinson, Luton, Great Britain

[73] Assignee: General Motors Corporation, Detroit, Mich.

[21] Appl. No.: 214,952

[22] Filed: Jul. 5, 1988

[30] Foreign Application Priority Data

Aug. 21, 1987 [GB] United Kingdom ................. 8719859

[51] Int. Cl.⁴ .............................................. F16C 11/06
[52] U.S. Cl. .................................... 403/158; 403/162; 280/96.1
[58] Field of Search .................... 403/158, 162, 157, 3; 280/96.1

[56] References Cited

U.S. PATENT DOCUMENTS 4,635,952  1/1987  Smith .................................. 280/96.1

Primary Examiner—Andrew V. Kundrat
Attorney, Agent, or Firm—Ernest E. Helms

[57] ABSTRACT

A kingpin assembly for an axle of a motor vehicle comprising a front axle beam and a steering knuckle pivotally mounted thereon, the kingpin assembly comprising a kingpin fixedly secured in an aperture in the front axle beam and passing through an aperture in the steering knuckle; a bearing positioned around the kingpin within the aperture in the steering knuckle to allow relative rotation between the steering knuckle and the kingpin, and a predetermined number of annular spacers positioned around the kingpin and between the front axle beam and the bearing for providing a predetermined spacer height and for providing a required pre-load for the assembly kingpin assembly, the annular spacers having a predetermined thickness (preferably in excess of 1.0 mm) and being selected from a range of annular spacers comprising annular spacers having one of a selected number of small variations in thickness, and which when assembled can provide a variation in excess of the possible range of spacer height.

6 Claims, 1 Drawing Sheet

U.S. Patent    Apr. 10, 1990    4,915,530
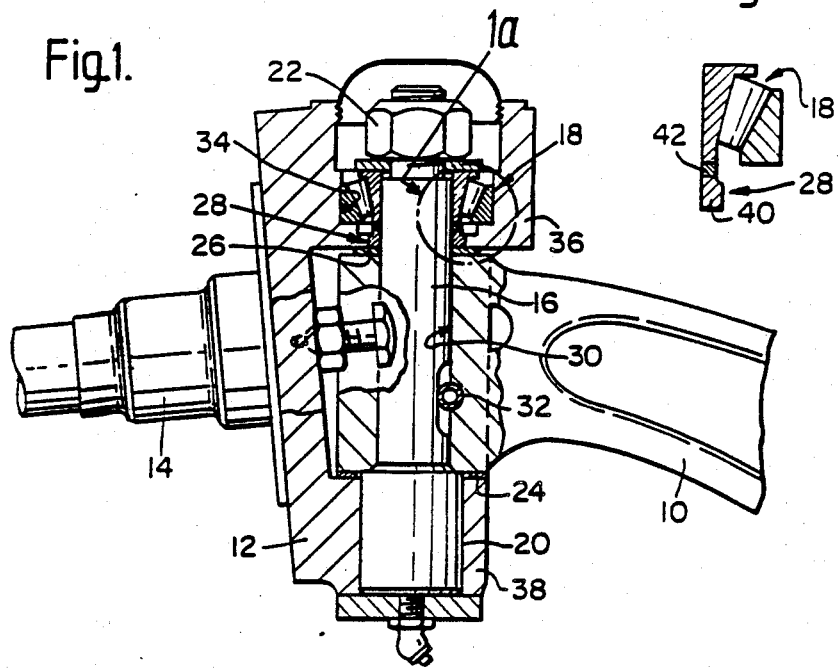
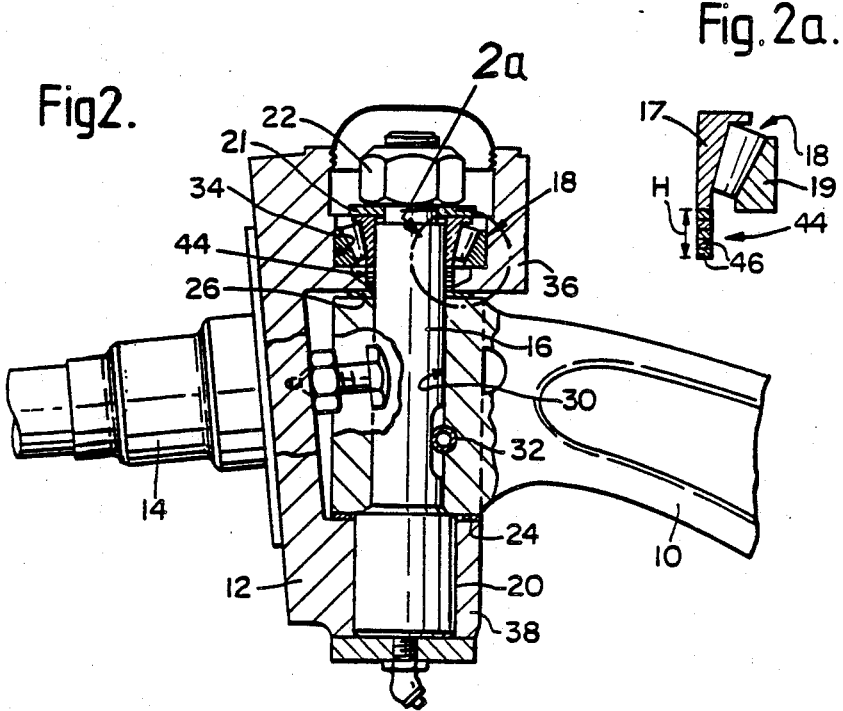

KINGPIN ASSEMBLY

This invention relates to a kingpin assembly for an axle of a motor vehicle, and in particular to a spacer assembly for a kingpin of a front axle of a motor vehicle.

It is known to provide a spacer assembly between a front axle beam of a motor vehicle and a bearing for the kingpin which is mounted within a steering knuckle. The known spacer assembly comprises a cylindrical support spacer and several annular shims which are positioned around the kingpin, with the cylindrical support spacer engaging the axle beam, and the annular shims being positioned between the cylindrical support spacer and the bearing. In this known assembly the thickness of the annular shims are typically a few hundredths of a millimeter with increments of 0.025 mm (0.001 inch). The annular shims also have a narrow annular width which makes them prone to splitting at their outside diameter due to even narrower contact from the inner race of the bearing (since it has a corner radius at its bore) and a high axial loading through kingpin tension. In addition, many shims may be required (ten or more) to achieve the required pack height for one extreme of manufacturing tolerances thereby making pack heights vary considerably more than the nominal 0.025 mm (0.001 inch) increments.

On beam type front axle assemblies, to avoid excessive axial movement at the bearing (which is usually a taper roller thrust bearing) during operation it is desirable to pre-load the bearing during axle assembly such that this pre-load is just removed as the wheel contacts the ground when installed on the vehicle. This requires a pre-load tolerance in excess of zero but considerably less than one ton (which approximates to 0.025 mm on spacer height). A pre-load outside this range either results in excessive free play and the risk of brinelling of the bearing, or stiff steering which affects returnability. Assembly of this known space assembly quite often results in a pre-load on the bearing which is outside the desired range. Further, during assembly, when the kingpin nut is tightened, relative rotation (or slip) will often occur at the interface between the bearing and its adjacent annular shim and/or between the cylindrical support spacer and its adjacent annular shim and/or between adjacent annular shims. This can result in rutching or tearing of the annular shims which can cause uneven support and/or foul the cage of the bearing. Further still, in order to accommodate manufacturing tolerances in the steering knuckle, the bearing and the cylindrical support spacer, it is necessary for the annular shims typically to cover a range of 0.94 mm (0.037 inches), hence ten or more annular shims may be required. The height of the cylindrical support spacer also has to be taken into account during assembly of the known spacer assembly. This can make handling and checking difficult during assembly.

It is an object of the present invention to overcome the above mentioned problems associated with the known spacer assembly.

To this end, a kingpin assembly in accordance with the present invention comprises a kingpin fixedly secured in an aperture in the axle beam and passing through an aperture in the steering knuckle; a bearing positioned around the kingpin within the aperture in the steering knuckle to allow relative rotation between the steering knuckle and the kingpin, and a predetermined number of annular spacers positioned around the kingpin and between the axle beam and the bearing for providing a predetermined spacer height and for providing a required pre-load for the assembled kingpin assembly, each annular spacer having a predetermined thickness (preferably in excess of 1.0 mm) and being selected from a range of annular spacers comprising annular spacers having one of a selected number of small variations in thickness, and which when assembled can provide a variation in excess of the possible range of spacer height.

In the kingpin assembly of the present invention, the cylindrical support spacer and the annular shims of the known assembly have been replaced by a predetermined number of annular spacers. Preferably the predetermined number is five. Preferably, in this case, the range of annular spacers comprises annular spacers having from five (the preferred selected number) different thicknesses, say 2.485 mm, or 2.500 mm or 2.575 mm, or 2.650 mm, or 2.665 mm. By selecting combinations totalling five of the above annular spacers up to sixty-one variations of spacer height can be achieved, with the range lying between 12.425 mm (five 2.485 mm spacers) and 13.325 mm (five 2.665 mm spacers). This arrangement therefore provides a large number of variations in, and facilitates fine increments in, spacer height for a small number of annular spacers. The present invention has the further advantages of being robust (flimsy annular shims are not required) and not susceptible to rutching or tearing; of providing easier handling and identification (the annular spacers are thick enough to allow peripheral marking to identify exact thickness); of providing reduced spacer variety and stocking; and of providing a system which lends itself to automation dispensing and measurement checking in a high production situation.

Preferably, the variations in the thicknesses of the annular spacers are multiples of a predetermined increment. In the above-mentioned example of five annular spacers, the increment is 0.015 mm, and the multiples thereof are 0, 1, 6, 11, and 12.

The variation in the possible range of spacer height is preferably in excess of 0.70 mm, and preferably lies between 0.70 mm and 1.0 mm.

Other predetermined numbers of annular spacers may be selected and still provide the advantages stated above. The present invention is not restricted to five, which has been selected purely as a example. Similarly, it is not a requirement of this invention that the selected number of annular spacers having differing thicknesses in the range is equal to the predetermined number of annular spacers. For example, the range may consist of annular spacers having six different thicknesses, yet the predetermined number of annular spacers required may be five.

The required pre-load is typically up to 1.0 ton. The predetermined spacer height is dependent on the dimensions of the bearing and steering knuckle, and the deflection rate of the bearing and spacers.

The present invention will now be described, by way of example, with reference to the accompanying drawings, in which:

FIG. 1 is a partial cross section of a known kingpin assembly;

FIG. 1a is an enlarged view of the spacer assembly of the kingpin assembly shown in FIG. 1;

FIG. 2 is a partial cross section of a kingpin assembly in accordance with the present invention; and FIG. 2a is an enlarged view of the spacer assembly of the kingpin assembly shown in FIG. 2.

Referring to FIGS. 1 and 1a, a known kingpin assembly is shown. This known assembly is used to pivotally connect a front axle beam 10 of a motor vehicle with a steering knuckle 12. Integrally connected to the steering knuckle 12 is a stub axle 14 on which a wheel (not shown) of the motor vehicle can be rotatably mounted. The kingpin assembly comprises a kingpin 16, an upper tapered roller bearing 18, a plain bush bearing 20, a kingpin nut 22, a lower seal 24, an upper seal/thrust washer 26, and a spacer assembly 28.

The kingpin 16 is fixedly secured in an aperture 30 in the front axle beam 10 by a pin 32. The kingpin 16 projects into a stepped aperture 34 in an upper yoke 36 of the steering knuckle 12 at one end thereof, and at the other end is integrally connected with the plain bush bearing 20 which is mounted in a lower yoke 38 of the bearing knuckle. The lower seal 24 is positioned around the kingpin 16 between the front axle beam 10 and the lower yoke 38. The upper seal/thrust washer 26 is positioned around the kingpin 16 between the front axle beam 10 and the upper yoke 36. The upper bearing 18, outer race 19 is positioned around the kingpin 16 within the stepped aperture 34. The longitudinal axes of the upper bearing 18, the kingpin 16, and the plain bush bearing 20 are aligned such that the steering knuckle 12 can rotate relative to the kingpin 16 to allow the steering knuckle to pivot on the front axle beam 10.

In this known arrangement, the spacer assembly 28 comprises a cylindrical support spacer 40 and annular shims 42, with the cylindrical support spacer positioned around the kingpin 16 and above the upper seal/thrust washer 26, and with the annular shims positioned between the cylindrical support spacer and the upper bearing 18. This known arrangement has the disadvantages hereinbefore previously described.

Referring now to FIGS. 2 and 2a, like parts have been given the same reference numerals. In this arrangement, the spacer assembly 44 comprises five annular spacers 46. The annular spacers 46 have any of five different thicknesses lying in a range between 2.485 mm and 2.665 mm as hereinbefore described. With this arrangement, the spacer height H can be adjusted as required to lie within the range 12.425 mm to 13.325 mm. The spacer height H that is required can be predetermined from the dimensions of the upper bearing 18 and the steering knuckle 12. By placing suitable markings which indicate thickness on the peripheral edge of each annular spacer 46, the theoretical spacer height H can easily be identified and checked against the required spacer height. This arrangement has the advantages hereinbefore previously described.

The uppermost annular spacer contacts the inner race 17 of the upper bearing 18. Tightening of the nut causes a downward force to be imparted on the washer and inner race 17 of the upper bearing 18 via the washer 21. The lowermost annular spacer 46 contacts the washer/seal 26. The spacers 46 have a diameter less than that of the washer/seal 26.

The embodiments of the invention in which an exclusive property or privilege is claimed are defined as follows:

1. A kingpin assembly for an axle of a motor vehicle comprising an axle beam and a steering knuckle pivotally mounted thereon, the steering knuckle having upper and lower yokes, the kingpin assembly comprising a kingpin fixedly secured in an aperture in the axle beam and passing through apertures in the steering knuckle upper and lower yokes, the kingpin having an upper threaded end with an engaged nut having a washer underneath the nut surrounding the kingpin; a thrust washer/seal surrounding the kingpin between the axle beam and the upper yoke; a tapered roller thrust bearing having inner and outer races, the inner race being pressed downward by the washer when the nut is tightened, the outer race being positioned around the kingpin within the aperture in the steering knuckle upper yoke to allow relative rotation between the steering knuckle and the kingpin; and a predetermined number of annular spacers positioned around the kingpin and between the thrust washer/seal and the inner race of the bearing for providing a predetermined spacer height and for providing a required pre-load for the assembled kingpin assembly, the annular spacers having a predetermined thickness of at least 1.0 mm and a diameter less than that of the thrust washer/seal and being selected from a range of annular spacers comprising annular spacers having one of a selected number of small variations in thickness, and which when assembled can provide a variation in excess of the possible range of spacer height the uppermost of the annular spacers contacting the inner race of the thrust bearing and the lowermost of the annular spacers contacting the washer/seal.

2. A kingpin assembly as claimed in claim 1, wherein the predetermined number is five.

3. A kingpin assembly as claimed in claim 2, wherein the selected number of annular spacers in the range comprises five thereby providing sixty-one possible variations in spacer height.

4. A kingpin assembly as claimed in claim 1, wherein the variations in thickness of the annular spacers in the pack are multiples of a predetermined increment.

5. A kingpin assembly as claimed in claim 1, wherein the variation in the possible range of spacer height is in excess of 0.70 mm.

6. A kingpin assembly as claimed in claim 5, wherein the variation in the possible range of spacer height lies between 0.70 mm and 1.0 mm.

* * * * *